United States Patent

Inagawa

[19]

[11] Patent Number: 6,021,039
[45] Date of Patent: Feb. 1, 2000

[54] ELECTRIC DOUBLE-LAYER CAPACITOR

[75] Inventor: Masako Inagawa, Tokyo, Japan

[73] Assignee: NEC Corporation, Tokyo, Japan

[21] Appl. No.: 09/052,304

[22] Filed: Mar. 31, 1998

[30] Foreign Application Priority Data

Mar. 31, 1997 [JP] Japan ................................. 9-096512

[51] Int. Cl.⁷ .................................................. H01G 9/00
[52] U.S. Cl. ........................ 361/502; 361/512; 29/25.03
[58] Field of Search ................................... 361/502, 504, 361/508, 511, 512, 516, 523, 525, 528, 530; 29/25.03

[56] References Cited

U.S. PATENT DOCUMENTS

| | | | |
|---|---|---|---|
| 4,737,889 | 4/1988 | Nishino et al. | 361/502 |
| 5,072,335 | 12/1991 | Kurabayashi et al. | 361/502 |
| 5,086,373 | 2/1992 | Kurabayashi et al. | 361/502 |
| 5,115,378 | 5/1992 | Tsuchiya et al. | 361/502 |
| 5,142,451 | 8/1992 | Kurabayashi et al. | 361/502 |
| 5,144,537 | 9/1992 | Tsichiya et al. | 361/502 |
| 5,381,303 | 1/1995 | Yoshida et al. | 361/502 |
| 5,682,288 | 10/1997 | Wani | 361/502 |
| 5,867,363 | 2/1999 | Tsai et al. | 361/502 |

FOREIGN PATENT DOCUMENTS

| | | | |
|---|---|---|---|
| 3201519 | 9/1991 | Japan | H01G 9/00 |
| 4288361 | 10/1992 | Japan | C08L 65/00 |
| 684701 | 3/1994 | Japan | H01G 9/00 |
| 697003 | 4/1994 | Japan | H01G 9/00 |

*Primary Examiner*—Kristine Kincaid
*Assistant Examiner*—Anthony Dinkins
*Attorney, Agent, or Firm*—Hayes Soloway Hennessey Grossman & Hage PC

[57] ABSTRACT

An electric double-layer capacitor is provided, which prevents the apparent capacitance decrease on operation or use at a large discharge current. This capacitor includes at least one basic cell and a pair of external terminals electrically connected to ends of the at least one basic cell, respectively. Each of the at least one basic cell has a tubular electrically-insulating gasket having a tubular inner space and opening ends, a pair of polarizable electrodes placed in the inner space of the gasket, a porous separator sandwiched between the pair of electrodes and placed in the inner space of the gasket, and a pair of collectors placed to close the opening ends of the gasket, respectively. An electrolyte solution is stored in the inner space of the gasket. The solution is absorbed to the pair of electrodes. Each of the pair of electrodes has an inner surface contacted with an opposing surface of the separator and an outer surface contacted with a corresponding one of the pair of collectors. Each of the pair of electrodes is formed by stacked sub-electrodes having at least one interface extending along the pair of collectors. The at least one interface allows ions of the electrolyte solution to diffuse.

9 Claims, 11 Drawing Sheets

ELECTRIC DOUBLE-LAYER CAPACITOR

BACKGROUND OF THE INVENTION

1. Field of the Invention

The present invention relates to an electric double-layer capacitor and more particularly, to an electric double-layer capacitor having positive and negative polarizable electrodes made of a polarizable solid material such as activated-carbon.

2. Description of the Prior Art

An electric double-layer capacitor is a capacitor utilizing an electric double-layer generated at an interface of a solid (i.e., a polarizable electrode) and an electrolyte solution. This capacitor has a feature that a large capacitance in the order of farad (F) is readily realized, which is due to the fact that the electric double-layer equivalent to a dielectric layer in a popular capacitor is approximately as small as a molecule diameter.

FIGS. 1 and 2 show a conventional electric double-layer capacitor.

As shown in FIG. 2, this conventional electric double-layer capacitor 109 has a stacked structure 106 comprised of rectangular plate-shaped basic cells 105. These basic cells 105 are stacked in a direction perpendicular to the cells 105, and are electrically connected in cascade. Each of the basic cells 105 is a unit of stacking.

A pair of external terminal plates 108 are attached onto the outermost basic cells 105 of the stacked structure 106, respectively. A pair of rubber plates (not shown) serving as spacers are attached onto the pair of external terminal plates 108, respectively. A pair of pressing plates 107 are attached onto the pair of rubber plates, respectively.

Connection bolts (not shown) are inserted to penetrate the stacked structure 106 of the basic cells 105, the external terminal plates 108, the pair of rubber plates, and the pair of pressing plates 107 at the four corners of the structure 106. Nuts (not shown) are engaged with the screws formed at both ends of the connection bolts to press the stacked basic cells 105 along the bolts, thereby holding or combining the stacked basic cells 105, the external terminal plates 108, the pair of rubber plates, and the pair of pressing plates 107 together under pressure.

Due to the applied pressure, the contact resistance across the adjacent basic cells 105 and that across the outermost basic cells 105 and the corresponding terminal plates 108 are kept low.

As shown in FIG. 1, each of the basic cells 105 is comprised of a pair of rectangular plate-shaped, positive and negative polarizable electrodes 104, a non-electron-conductive, porous sheet-like separator 102, an electrically insulating, tubular gasket 103, and a pair of electrically conductive sheet-like collectors 101.

An electrolyte solution 113 such as a water solution of sulfuric acid is absorbed onto the polarizable electrodes 104. The separator 102 is sandwiched between the pair of electrodes 104. The pair of electrodes 104 and the separator 102 are placed in a tubular inner space 116 of the gasket 103. The collectors 101 are placed on both ends of the gasket 103 to close its opening ends, respectively.

The electrolyte solution 113 is injected and stored in the tubular inner space 116 of the gasket 103. The pair of electrodes 104 and the separator 102 are immersed in the electrolyte solution 113. The solution 113 is sealed by the gasket 103 and the pair of collectors 101.

The pair of collectors 101, which are fixed onto the respective electrodes 104, are made of an electrically conductive rubber or plastic containing an electrically conducive carbon powder. The pair of collectors 101 serve not only as terminal plates of the basic cell 105 but also as sealing members for the electrolyte solution 113 together with the gasket 103.

The pair of polarizable electrodes 104 are, for example, made of a solid activated-carbon/polyacen composite material, which is disclosed in the Japanese Non-Examined patent Publication No. 4-288361 published in 1992. The pair of electrodes 104 are opposed to one another through the separator 102.

The separator 102 is made of porous glass fibers used for a lead-acid battery, which is non-electron-conductive and ion-permeable.

The pair of external terminal plates 108 are attached onto the outermost collectors 101 of the basic cells 105 of the stacked structure 106, respectively.

Generally, the above-identified basic cell 105 independently exhibits a charge-storage (i.e., capacitor) function and as a result, the single cell 105 may be used as an electric double-layer capacitor. However, actually, a plurality of the basic cells 105 are often connected in cascade to thereby constitute the stacked structure 106, as shown in FIG. 2. The purpose of this stacked structure 106 is to provide a sufficient dielectric strength against the supply voltage for an electronic circuitry in which the electric double-layer capacitor 109 is used.

In recent years, novel application fields of electric double-layer capacitors have been found and studied because of the increased capacitance and the decreased Equivalent Series Resistance (ESR). For example, an electric double-layer capacitor is used as an auxiliary power supply for driving a starter motor of an automobile together with a lead-acid battery, as an auxiliary power supply for coping with instantaneous interruption of various systems, and as an auxiliary power supply for assisting a solar battery.

In these novel application fields, it is required that the electric double-layer capacitors serve to supply electric power as long as possible. It is indispensable for the electric double-layer capacitors to ensure a sufficiently long operation period even at a large discharge current.

From this point of view, the conventional electric double-layer capacitor 109 shown in FIGS. 1 and 2 does not have a satisfactorily large capacitance. If the thickness of each polarizable electrode 104 is increased, the capacitance may be increased. In this case, however, the ions of the electrolyte solution 113 existing within the micro pores of the electrodes 104, which have formed electric double-layers together with electric charges existing in the polarizable electrodes 104 through a charge process, need to move a longer distance out of the micro pores during a discharge process.

This causes a problem that the ions existing in the micro pores of the electrodes 104 near the collectors 101 are unable to follow the movement or diffusion of the remaining ions, because the ions existing near the collectors 101 are difficult to quickly diffuse from the micro pores toward the separator 102 through the macro pores of the electrodes 104. In other words, the ions existing in the micro pores located near the collectors 101 are not used for a discharge process at a large current.

Thus, the diffusion rate or velocity of the ions existing in the micro pores becomes a rate-determinate factor in a discharge process, thereby decreasing apparently the capacitance of the conventional electric double-layer capacitor 109. This results in degradation of the capacitor function.

To solve this problem of the capacitor function degradation, an improved electric double-layer capacitor was developed, which is disclosed in the Japanese Non-Examined Patent Publication No. 3-201519 published in September 1991.

FIG. 3 shows one of basic cells of the improved electric double-layer capacitor 105' disclosed in the Japanese Non-Examined Patent Publication No. 3-201519.

In the electric double-layer capacitor 105' in FIG. 3, a pair of polarizable electrodes 104' are used instead of the pair of polarizable electrodes 104 in FIG. 1.

Each of the polarizable electrode 104' is formed by a porous sintered material consisting of first and second activated carbons with different densities, in which each of the first and second activated carbons is made of sintered activated-carbon particles. The pair of electrodes 104' are placed in such a way that the second activated carbon having the higher density is contacted with the pair of collectors 101 and the first activated carbon having the lower density is contacted with the separator 102.

The polarizable electrode 104' is produced by a step of stacking a layer of a first powder of activated-carbon particles and a layer of a second powder of activated-carbon particles in a sintering mold, and a step of sintering the layers of the first and second powders under heat and pressure in the mold. The activated-carbon particles of the first and second powders are different in average particle size.

With the improved electric double-layer capacitor using the basic cell 105' shown in FIG. 3, the above-identified problem of the capacitor function degradation is solved without increasing the thickness of the polarizable electrode 104' with respect to the polarizable electrode 104 shown in FIG. 1. In this case, however, the necessary moving distance itself of the ions in the electrolyte solution 113, which have formed the electric double-layers, during a discharge process is not decreased. Therefore, the obtainable improvement is not satisfactory.

Additionally, with the improved electric double-layer capacitor using the basic cell 105' shown in FIG. 3, the polarizable electrode 104' is produced by successively forming the layers of the first and second powders of activated-carbon particles in a sintering mold, and then, by sintering the layers of the first and second powders under heat and pressure. Therefore, the polarizable electrode 104' tends to have a camber or crack, or to be split due to the difference in shrinkage degree of the first and second powders during the sintering process. Thus, the fabrication yield becomes low.

Moreover, since the activated-carbon particles forming the polarizable electrode 104' is at most several hundreds micrometers in diameter, it is difficult to discriminate between the high- and low-density sides by the naked eye. To avoid such the difficulty, some mark may be provided on the high- or low-density side of the electrode 104'. However, this necessitates a confirmation step of the mark in the assembly processes and results in addition of an unnecessary step.

Consequently, not only the fabrication yield of the capacitor but also the productivity thereof will degrade.

SUMMARY OF THE INVENTION

Accordingly, an object of the present invention is to provide an electric double-layer capacitor that prevents the apparent capacitance decrease on operation or use at a large discharge current.

Another object of the present invention is to provide an electric double-layer capacitor that is able to fabricate at a high fabrication yield and a high productivity.

The above objects together with others not specifically mentioned will become clear to those skilled in the art from the following description.

An electric double-layer capacitor according to the present invention is comprised of at least one basic cell and a pair of external terminals electrically connected to ends of the at least one basic cell, respectively.

Each of the at least one basic cell has a tubular electrically-insulating gasket having a tubular inner space and opening ends, a pair of polarizable electrodes placed in the inner space of the gasket, a porous separator sandwiched between the pair of electrodes and placed in the inner space of the gasket to separate the inner space of the gasket, and a pair of collectors placed to close the opening ends of the gasket, respectively.

An electrolyte solution is stored in the inner space of the gasket. The solution is absorbed to the pair of electrodes.

Each of the pair of electrodes has an inner surface contacted with an opposing surface of the separator and an outer surface contacted with a corresponding one of the pair of collectors.

Each of the pair of electrodes is formed by stacked sub-electrodes having at least one interface extending along the pair of collectors. The at least one interface allows ions of the electrolyte solution to diffuse between inside and outside of the pair of electrodes through the at least one interface.

With the electric double-layer capacitor according to the present invention, each of the pair of polarizable electrodes of the at least one basic cell is formed by stacked sub-electrodes having at least one interface extending along the pair of collectors. Also, the at least one interface of the sub-electrodes allows the ions of the electrolyte solution to diffuse between inside and outside of the pair of electrodes through the at least one interface.

Therefore, the ions existing in the micro pores of the pair of electrodes, which have formed electric double-layers together with electric charges existing in the pair of electrodes through a prior charge process, need not move such a long distance as that in the conventional capacitors shown in FIGS. 1 to 3 to go out of the micro pores during a discharge process. Accordingly, the ions existing in the micro pores of the pair of electrodes located near the pair of collectors are able to be effectively used even for a discharge process at a large current.

As a result, the apparent capacitance decrease is prevented from occurring on operation or use at a large discharge current.

Also, unlike the above-described conventional capacitor shown in FIG. 3, each of the sub-electrodes may be fabricated by a same material having a same property. Alternately, if each of the sub-electrodes is fabricated by different materials having different properties, it may be formed by using different molds under different conditions.

Therefore, the sub-electrodes do not tend to have a camber or crack, or to be split due to the shrinkage degree of the material during a sintering process. Thus, no fabrication yield decrease will occur.

Unlike the above-described conventional capacitor shown in FIG. 3, no discrimination step of the sub-electrodes nor confirmation step of the mark are necessary during the fabrication process, because each of the electrodes is formed by simply stacking the sub-electrodes independent of the difference in material and/or property.

As a result, the electric double-layer capacitor according to the present invention is able to fabricate at a high productivity.

Moreover, since an additional electric double-layer or layers are formed at the at least one interface of the stacked sub-electrodes, there is an additional advantage that the capacitance becomes higher.

In a preferred embodiment of the capacitor according to the present invention, the stacked sub-electrodes are equal or different in thickness.

In another preferred embodiment of the capacitor according to the present invention, the stacked sub-electrodes are equal or different in average pore size.

In still another preferred embodiment of the capacitor according to the present invention, the sub-electrodes are made of a same material or different materials.

In still another preferred embodiment of the capacitor according to the present invention, each of opposing surfaces of the sub-electrodes has a surface roughness of approximately 10 $\mu$m or more.

In a further preferred embodiment of the capacitor according to the present invention, one of opposing surfaces of the sub-electrodes has depressions and the other of opposing surfaces of the sub-electrodes has protrusions. The depressions and the protrusions are completely engaged together.

In a further preferred embodiment of the capacitor according to the present invention, each of opposing surfaces of the sub-electrodes has depressions. The depressions of the sub-electrodes are combined to form gaps at the interface of the sub-electrodes. The cross section of the gaps may be any shape such as rectangular, circular, or the like.

In a further preferred embodiment of the capacitor according to the present invention, each of opposing surfaces of the sub-electrodes is flat or saw-tooth-shaped in cross section.

BRIEF DESCRIPTION OF THE DRAWINGS

In order that the invention may be readily carried into effect, it will now be described with reference to the accompanying drawings.

DETAILED DESCRIPTION OF THE PREFERRED EMBODIMENTS

Figure 1:
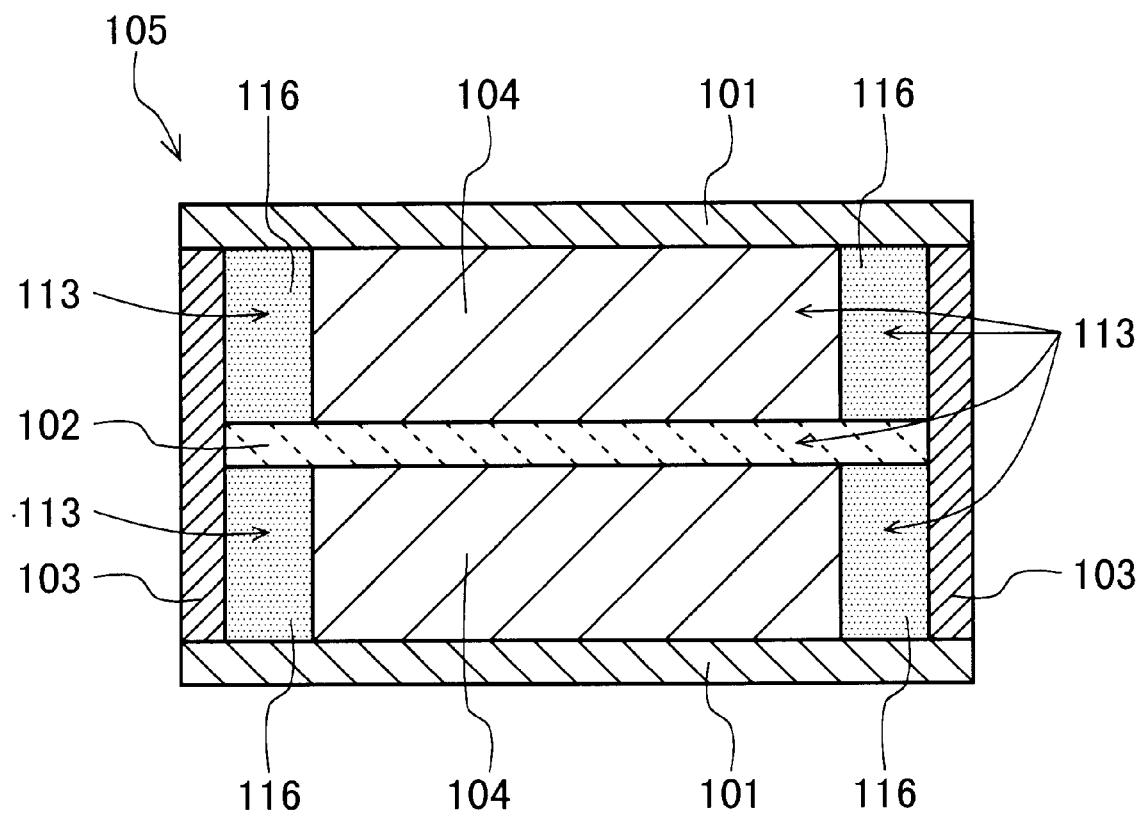
FIG. 1 is a vertical, cross-sectional view of a basic cell of a conventional electric double-layer capacitor, which is along the line I—I in FIG. 2.

Preferred embodiments of the present invention will be described in detail below while referring to the drawings attached.

First Embodiment

Figure 4:
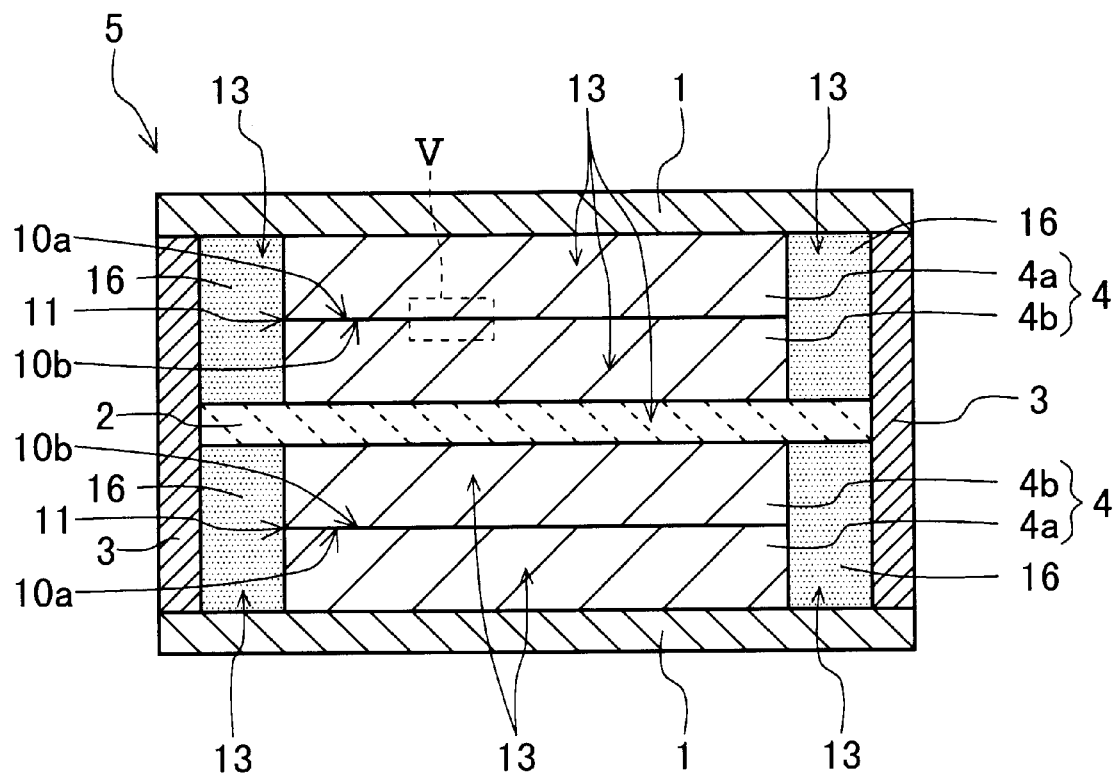
FIG. 4 is a vertical, cross-sectional view of a basic cell of an electric double-layer capacitor according to a first embodiment of the present invention, which is along the line IV—IV in FIG. 15.
Figure 5:
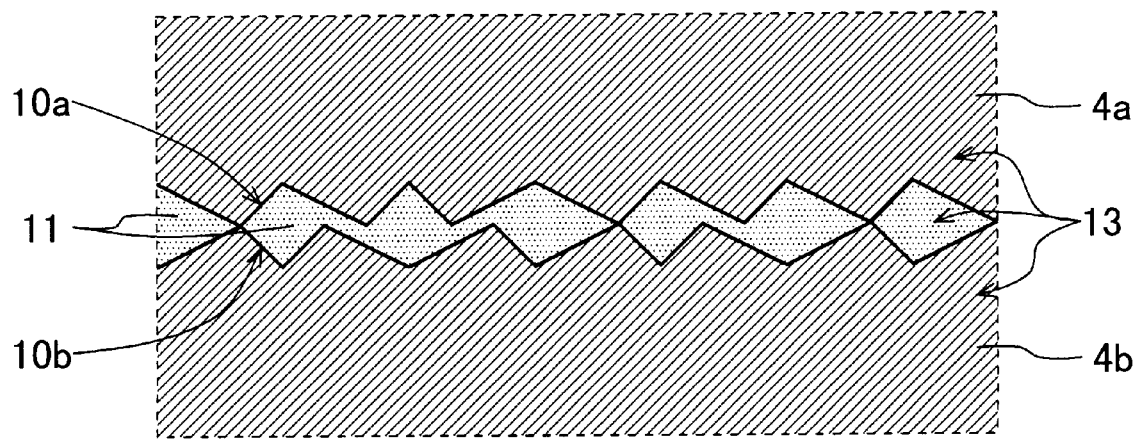
FIG. 5 is an enlarged, schematic, partial cross-sectional view of the interface of the polarizable sub-electrodes of the electric double-layer capacitor according to the first embodiment of FIG. 4, which is a location V in FIG. 4.
Figure 15:
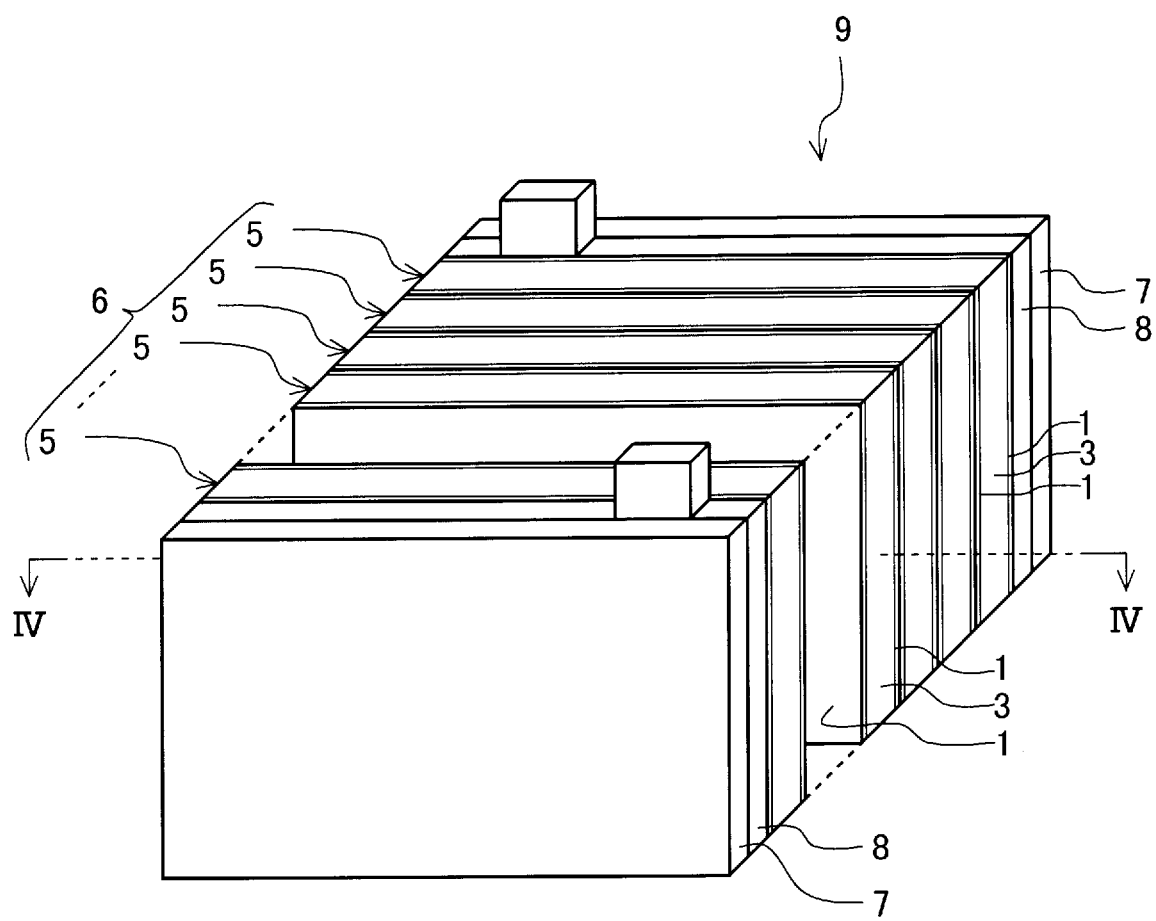
FIG. 15 is a perspective view of the electric double-layer capacitor using one of the basic cells according to the first to ninth embodiments shown in FIGS. 4 to 14.

FIGS. 4, 5, and 15 show an electric double-layer capacitor according to a first embodiment of the present invention.

As shown in FIG. 15, the electric double-layer capacitor 9 according to the first embodiment has a stacked structure 6 comprised of rectangular plate-shaped basic cells 5. These basic cells 5 are stacked in a direction perpendicular to the cells 5, and are electrically connected in cascade. Each of the basic cells 5 is a unit of stacking.

A pair of external terminal plates 8 are attached onto the outermost basic cells 5 of the stacked structure 6, respectively. A pair of rubber plates (not shown) serving as spacers are attached onto the pair of external terminal plates 8, respectively. A pair of pressing plates 7 are attached onto the pair of rubber plates, respectively.

Connection bolts (not shown) are inserted to penetrate the stacked structure 6 of the basic cells 5, the external terminal plates 8, the pair of rubber plates, and the pair of pressing plates 7 at the four corners of the structure 6. Nuts (not shown) are engaged with the screws formed at the both ends of the connection bolts to press the stacked basic cells 5 along the bolts, thereby holding or combining the stacked basic cells 5, the external terminal plates 8, the pair of rubber plates, and the pair of pressing plates 107 together under pressure.

Due to the applied pressure, the contact resistance across the adjacent basic cells 5 and that across the outermost basic cells 5 and the corresponding terminal plates 8 are kept low.

As shown in FIG. 4, each of the basic cells 5 is comprised of a pair of rectangular plate-shaped, positive and negative polarizable electrodes 4, a non-electron-conductive, porous sheet-like separator 2, an electrically insulating, tubular gasket 3, and a pair of electrically conductive sheet-like collectors 1. The pair of electrodes 4 are opposed to one another through the separator 2.

An electrolyte solution 13 is injected and stored in the tubular inner space 16 of the gasket 3. The pair of electrodes 4 and the separator 2 are immersed in the electrolyte solution 13. The solution 13 is sealed by the gasket 3 and the pair of collectors 1. The electrolyte solution 13 is absorbed onto the polarizable electrodes 4.

The separator 2 is sandwiched between the pair of electrodes 4. The pair of electrodes 4 and the separator 2 are placed in a tubular inner space 16 of the gasket 3. The collectors 1 are placed on both ends of the gasket 3 to close its opening ends, respectively.

The pair of collectors 1 are fixed onto the respective electrodes 4. The pair of collectors 1 serve not only as terminal plates of the basic cell 5 but also as sealing members for the electrolyte solution 13 together with the gasket 3.

The pair of external terminal plates 8 are attached onto the outermost collectors 1 of the basic cells 5 of the stacked structure 6, respectively.

The pair of polarizable electrodes 4 are made of a solid activated-carbon, which is produced by mixing activated-carbon powder with a binder such as a phenolic resin. Any other material and production method may be used for the electrodes 4. The separator 2 is made of porous glass fibers used for a lead-acid battery, which is non-electron-conductive and ion-permeable. The collectors 1 are made of an electrically conducive butyl rubber containing an electrically conducive carbon powder. The gasket 3 is made of an Acrylonitrile-Butadiene-Styrene (ABS) resin with a heat-resistant property.

As the electrolyte solution 13, a 30-wt % water solution of diluted sulfuric acid is used in this embodiment.

As clearly shown in FIG. 4, each of the positive and negative polarizable electrodes 4 is formed by two stacked sub-electrodes 4a and 4b. The sub-electrode 4a is contacted with the separator 2, and the sub-electrode 4b is contacted with the collector 1.

The sub-electrodes 4a and 4b are formed by a same material of a mixture of a phenolic-system activated-carbon powder (70 wt %) and a phenolic resin powder serving as a binder (30 wt %). The sub-electrodes 4a and 4b are fabricated through the comminution, granulation, and forming processes of this mixture by known methods. Then, the formed mixture is subjected to a known sintering process, thereby producing the sub-electrodes 4a and 4b.

The sub-electrodes 4a and 4b have a same size and shape, and a same thickness, an example of which are as follows.

The sub-electrodes 4a and 4b has a size of 70 mm (length, L), 50 mm (width, W), and 1 mm (thickness, t). The inner size of the gasket 3 is 74 mm (length, L), 54 m (width, W), and 2.2 mm (thickness, t).

The opposing surfaces 10a and 10b of the sub-electrodes 4a and 4b at the interface 11 have a same surface roughness (Ra), where Ra is given as the averaged surface-roughness using the center-line of the roughness curve. For example, the roughness (Ra) is approximately 5, 8, 9, 9.5, 10, 10.5, or 15 μm.

For example, the number of the basic cells 5 to be stacked for the stacked structure 6 is 18, thereby setting the withstand voltage as 15 V.

The electric double-layer capacitor 9 according to the first embodiment may be fabricated through the known processes, except that each of the electrode 4 only is replaced with the stacked sub-electrodes 4a and 4b.

With the electric double-layer capacitor 9 according to the first embodiment, each of the pair of polarizable electrodes 4 of the basic cell 5 is formed by two stacked sub-electrodes 4a and 4b having the interface 11 extending along the pair of collectors 1.

As shown in FIG. 5, the opposing surfaces 10a and 10b of the sub-electrodes 4a and 4b at the interface 11 are roughened, and a narrow and irregular gap or gaps is/are formed at the interface 11. Therefore, the interface 11 of the sub-electrodes 4a and 4b allows the ions of the electrolyte solution 13 to diffuse between the inside and outside of the pair of electrodes 4 through the interface 11.

Figure 2:
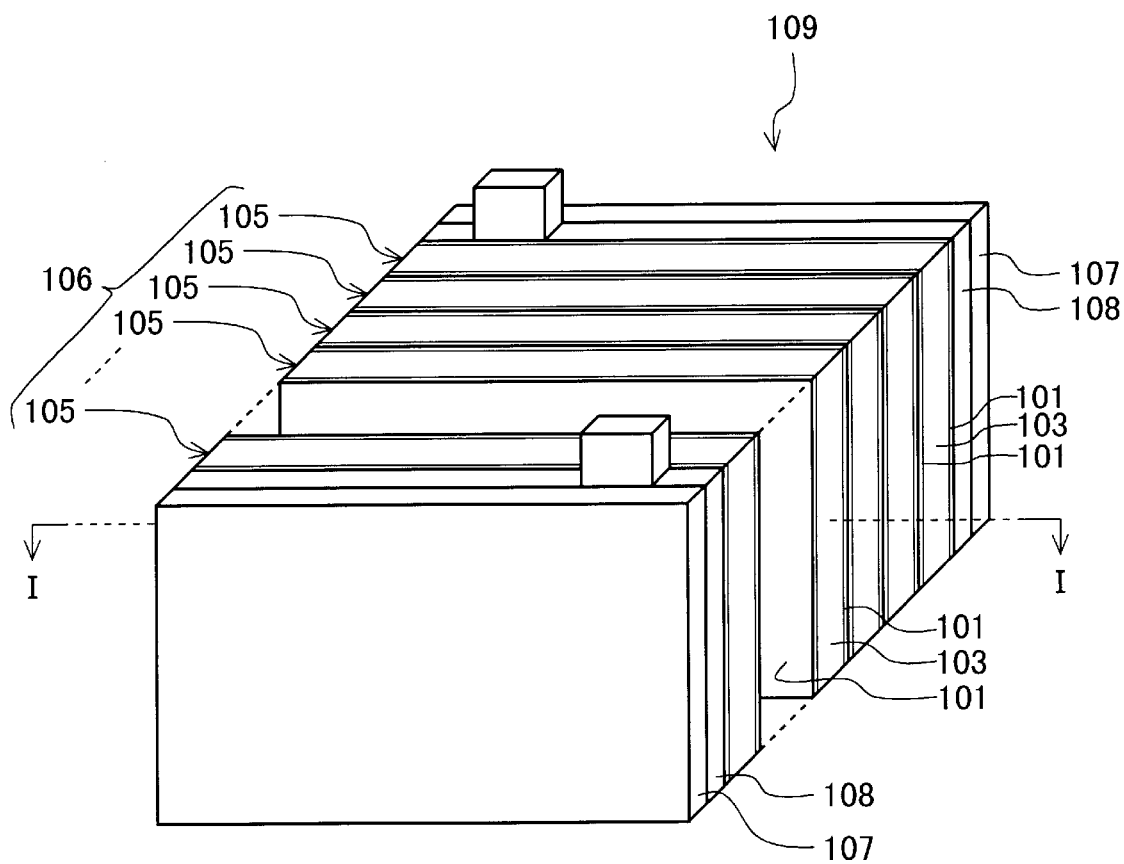
FIG. 2 is a perspective view of the conventional electric double-layer capacitor including the basic cell shown in FIG. 1.
Figure 3:
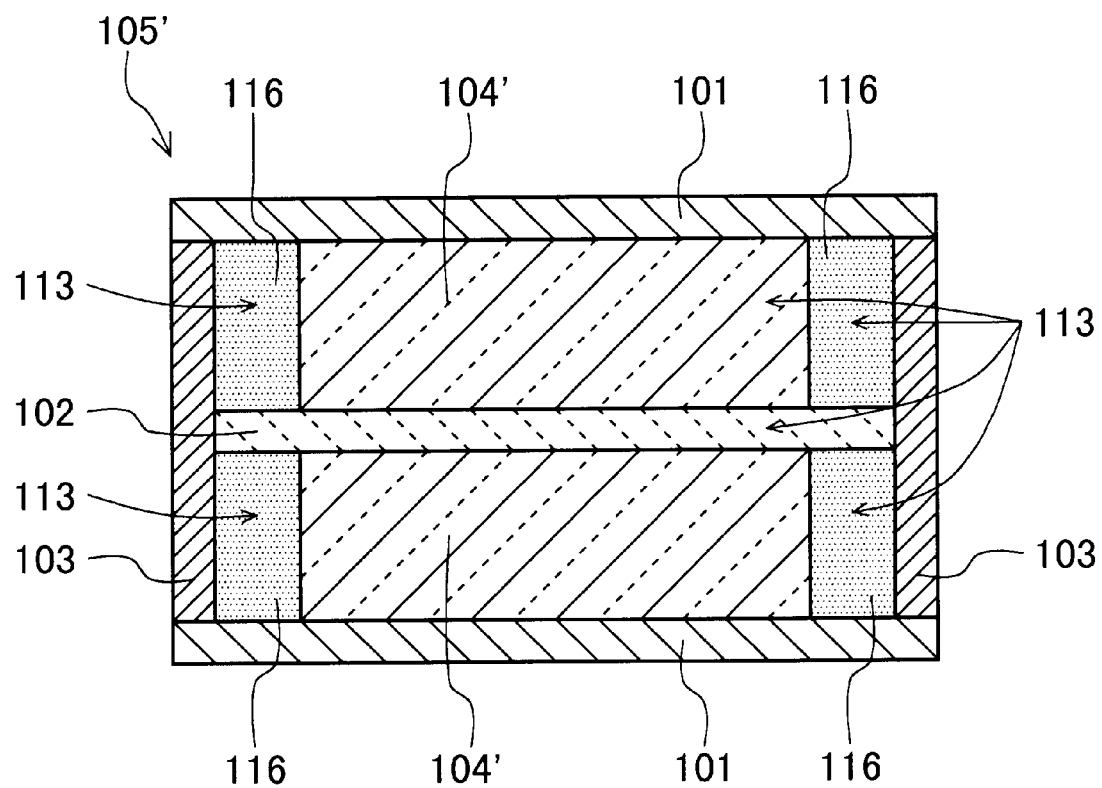
FIG. 3 is a vertical, cross-sectional view of a basic cell of another conventional electric double-layer capacitor, which is along the line I—I in FIG. 2.

Therefore, the ions existing in the micro pores of the pair of electrodes 4, which have formed electric double-layers together with electric charges existing in the stacked sub-electrodes 4a and 4b through a prior charge process, need not move such a long distance as that in the conventional capacitors shown in FIGS. 1 to 3 to go out of the micro pores during a discharge process. Accordingly, the ions existing in the micro pores of the pair of electrodes 4 located near the pair of collectors 1 are able to be effectively used even for a discharge process at a large current.

As a result, the apparent capacitance decrease is prevented from occurring on operation or use at a large discharge current.

Also, unlike the above-described conventional capacitor shown in FIG. 3, each of the sub-electrodes 4a and 4b is fabricated by a same material having a same property. Therefore, the sub-electrodes 4a and 4b do not tend to have a camber or crack, or to be split due to the shrinkage degree of the material during a sintering process. Thus, no fabrication yield decrease will occur.

Unlike the above-described conventional capacitor shown in FIG. 3, no discrimination step of the sub-electrodes 4a and 4b nor confirmation step of the mark are necessary during the fabrication process. As a result, the electric double-layer capacitor 9 according to the first embodiment is able to fabricate at a high productivity.

Moreover, since additional electric double-layers are formed at the interface 11 (or, the opposing surfaces 10a and 10b) of the stacked sub-electrodes 4a and 4b, there is an additional advantage that the capacitance becomes higher.

Second Embodiment

Figure 6:
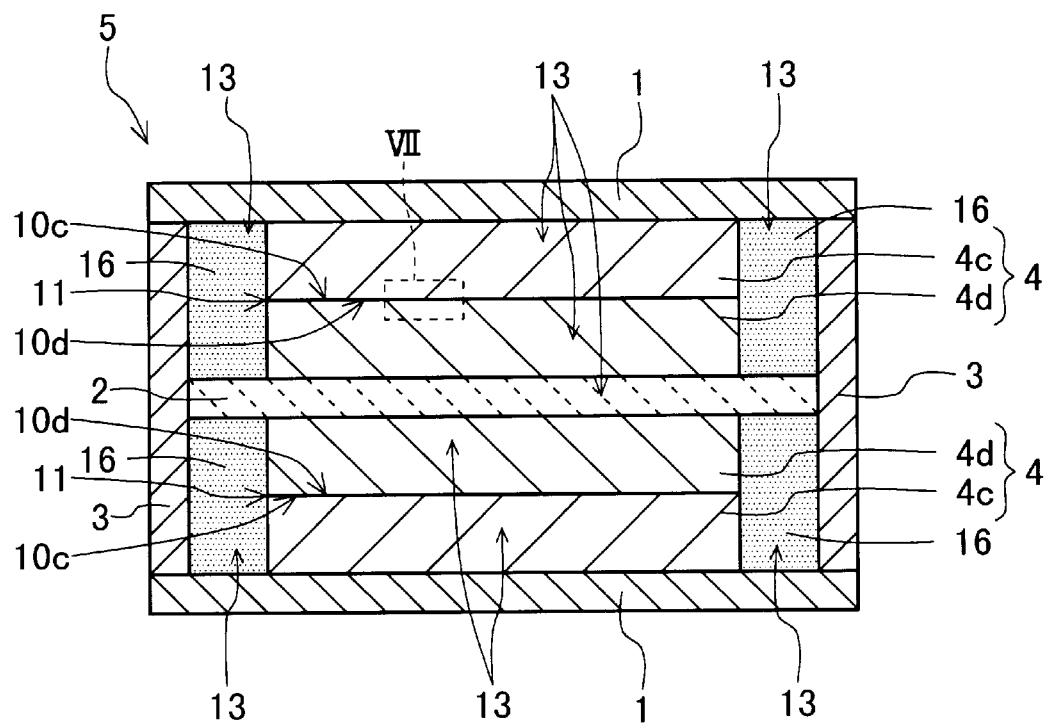
FIG. 6 is a vertical, cross-sectional view of a basic cell of an electric double-layer capacitor according to a second embodiment of the present invention, which is along the line IV—IV in FIG. 15.
Figure 7:
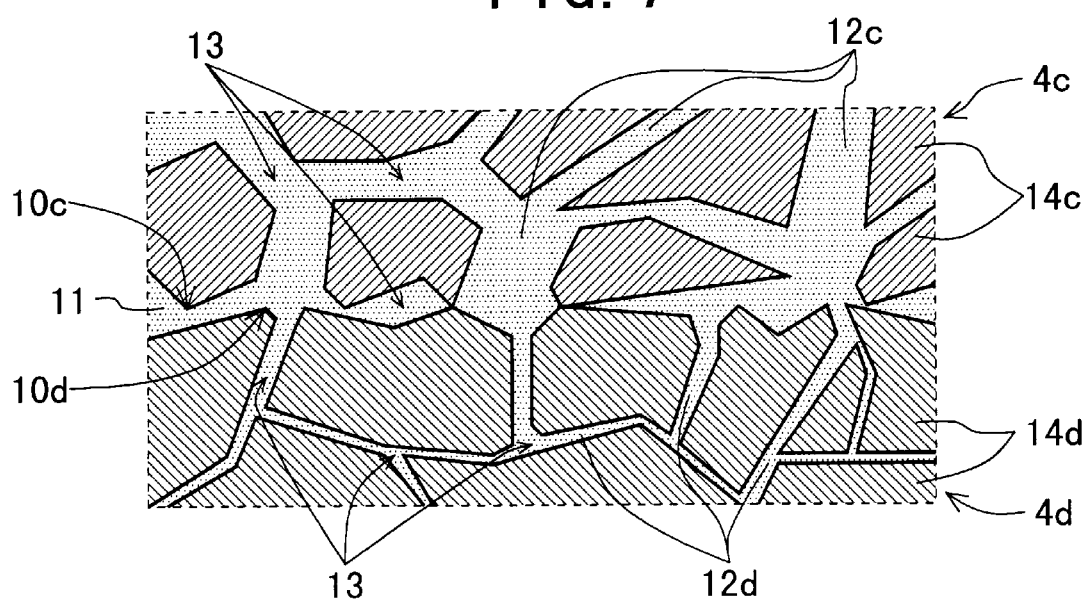
FIG. 7 is an enlarged, schematic, partial cross-sectional view of the interface of the polarizable sub-electrodes of the electric double-layer capacitor according to the second embodiment of FIG. 6, which is a location VII in FIG. 6.

FIGS. 6 and 7 show a basic cell used in an electric double-layer capacitor according to a second embodiment of the present invention.

This embodiment is the same as the first embodiment except that sub-electrodes 4c and 4d are different in average pore size from one another. Here, the sub-electrode 4c, which is contacted with the collector 1, has an average pore size of 5 μm. The sub-electrode 4d, which is contacted with the separator 2, has an average pore size of 1 μm.

As shown in FIG. 7, the sub-electrode 4c has large pores 12c within a matrix 14c while the sub-electrode 4d has small pores 12d within a matrix 14d. The reference numerals 10c and 10d indicate opposing surfaces of the sub-electrodes 4c and 4d, respectively.

With the electric double-layer capacitor 9 according to the second embodiment, it is clear that there are the same advantages as those in the first embodiment.

Since the sub-electrodes 4c and 4d have the different average pore sizes, there is an additional advantage that the mobility of the ions is readily adjusted by changing the average pore sizes.

Third Embodiment

Figure 8:
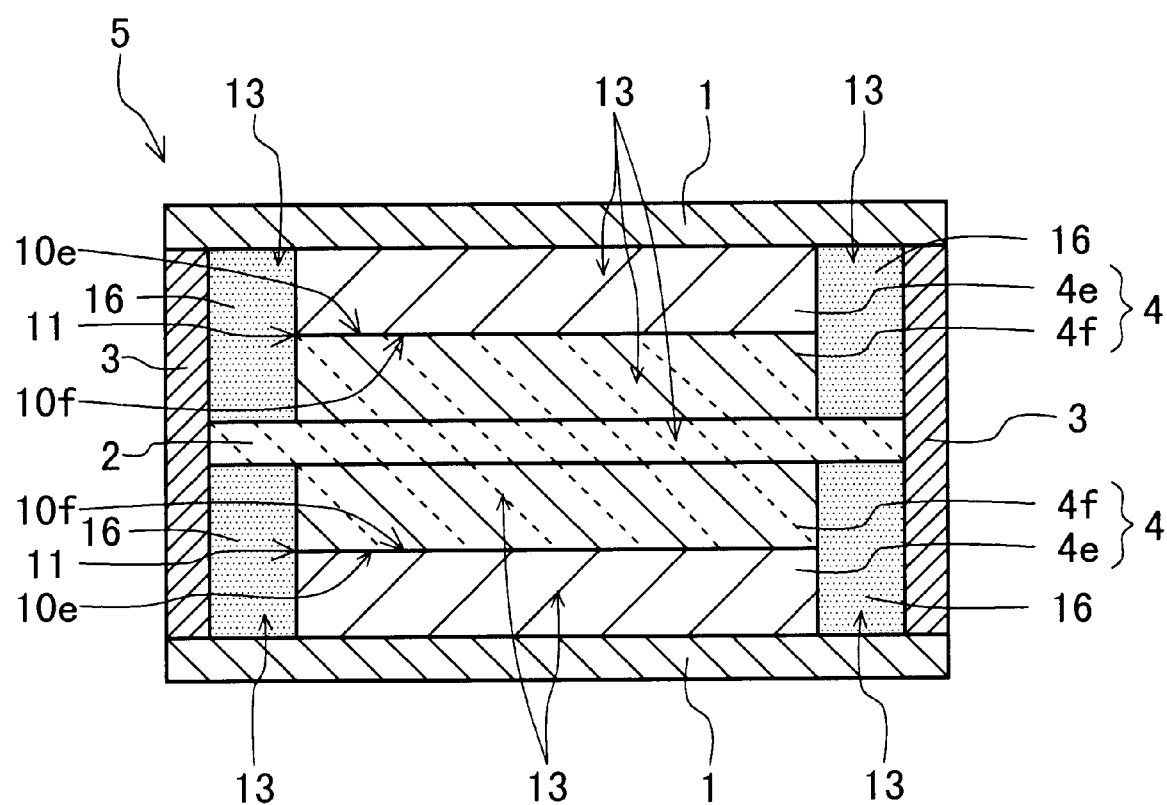
FIG. 8 is a vertical, cross-sectional view of a basic cell of an electric double-layer capacitor according to a third embodiment of the present invention, which is along the line IV—IV in FIG. 15.

FIG. 8 shows a basic cell 5 used in an electric double-layer capacitor according to a third embodiment of the present invention.

This embodiment is the same as the first embodiment except that sub-electrodes 4e and 4f are formed by different materials from one another. Here, the sub-electrode 4e is formed by a phenolic-system activated-carbon particle. The sub-electrode 4f is formed by a coconut shell flour-system activated-carbon particle. The reference numerals 10e and 10f indicate opposing surfaces of the sub-electrodes 4e and 4f, respectively.

With the electric double-layer capacitor 9 according to the third embodiment, it is clear that there are the same advantages as those in the first embodiment.

Since the sub-electrodes 4e and 4f are made of the different activated carbons, there is an additional advantage that the capacitor characteristic is readily adjusted by changing the kinds and/or combination of the activated carbons according to the wanted use.

Fourth Embodiment

Figure 9:
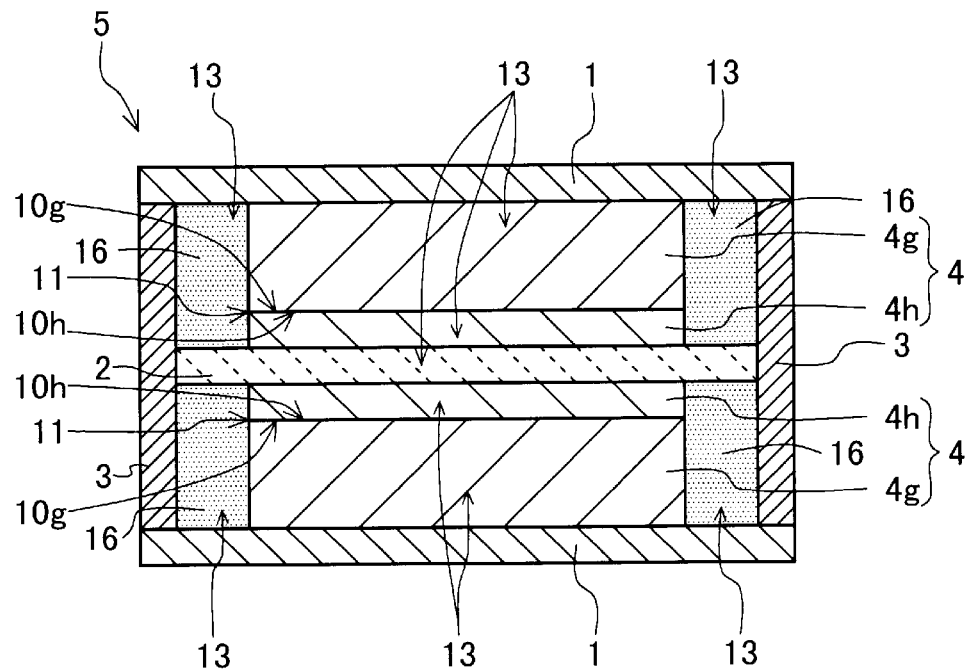
FIG. 9 is a vertical, cross-sectional view of a basic cell of an electric double-layer capacitor according to a fourth embodiment of the present invention, which is along the line IV—IV in FIG. 15.

FIG. 9 shows a basic cell 5 used in an electric double-layer capacitor according to a fourth embodiment of the present invention.

This embodiment is the same as the first embodiment except that sub-electrodes 4g and 4h are different in thickness from one another. Here, the sub-electrodes 4g and 4h are formed by a phenolic-system activated-carbon particle. The sub-electrode 4g has a thickness of 1.5 $\mu$m. The sub-electrode 4h has a thickness of 0.5 $\mu$m. The reference numerals 10g and 10h indicate opposing surfaces of the sub-electrodes 4g and 4h, respectively.

With the electric double-layer capacitor 9 according to the fourth embodiment, it is clear that there are the same advantages as those in the first embodiment.

Since the sub-electrodes 4g and 4h are equal in material and different in thickness, there is an additional advantage that the capacitance, size, and/or shape is readily adjusted by changing the thickness according to the customer's requirement.

Fifth Embodiment

Figure 10:
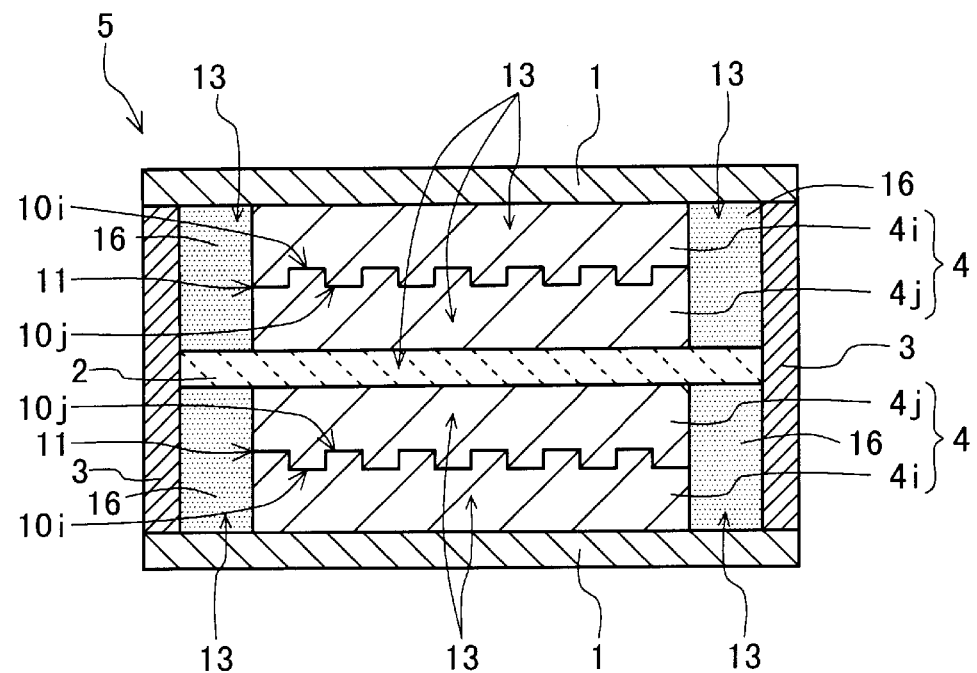
FIG. 10 is a vertical, cross-sectional view of a basic cell of an electric double-layer capacitor according to a fifth embodiment of the present invention, which is along the line IV—IV in FIG. 15.

FIG. 10 shows a basic cell 5 used in an electric double-layer capacitor according to a fifth embodiment of the present invention.

This embodiment is the same as the first embodiment except that a sub-electrode 4i has protrusions at its opposing surface 10i and a sub-electrode 4j has depressions at its opposing surface 10j. The shape and size of the protrusions and depressions are set to be roughly engaged with each other.

The protrusions, which have a height of 0.05 mm, are regularly formed along the longitudinal axis of the sub-electrode 4i and laterally arranged in parallel at a pitch of 5 mm.

The depressions, which have a depth of 0.05 mm, are regularly formed along the longitudinal axis of the sub-electrode 4j and laterally arranged in parallel at a pitch of 5 mm.

With the electric double-layer capacitor 9 according to the fifth embodiment, it is clear that there are the same advantages as those in the first embodiment.

Since the protrusions and depressions sub-electrodes 4g and 4h are equal in material and different in thickness, There is an additional advantage that the capacitor characteristic is readily adjusted by changing the shape, size and/or pitch of the protrusions and depressions.

Sixth Embodiment

Figure 11:
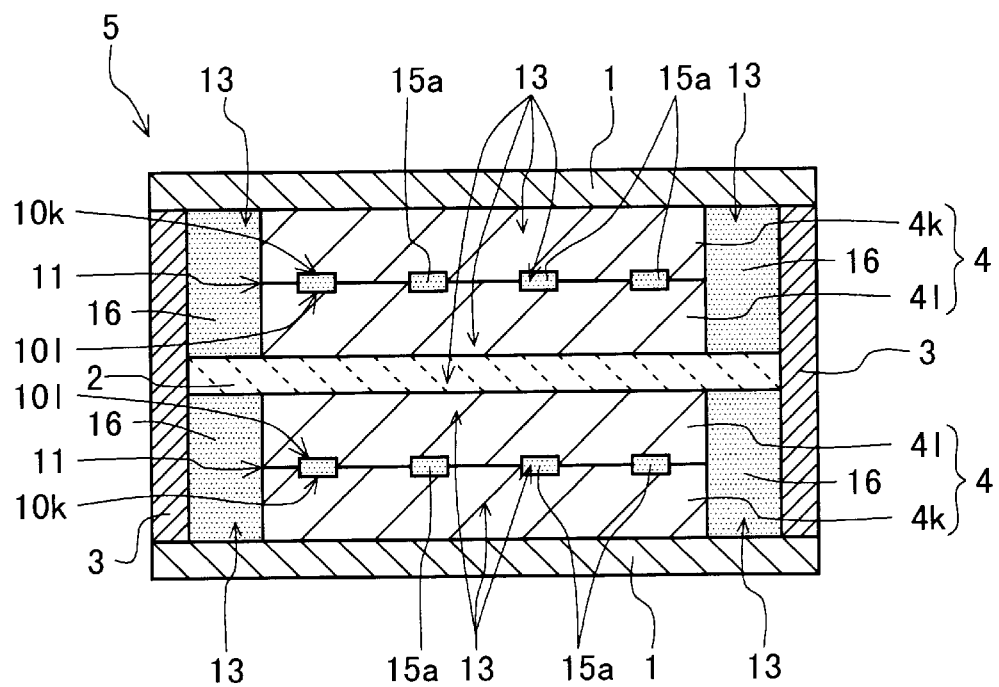
FIG. 11 is a vertical, cross-sectional view of a basic cell of an electric double-layer capacitor according to a sixth embodiment of the present invention, which is along the line IV—IV in FIG. 15.

FIG. 11 shows a basic cell 5 used in an electric double-layer capacitor according to a sixth embodiment of the present invention.

This embodiment is the same as the first embodiment except that a sub-electrode 4k has depressions at its opposing surface 10k and a sub-electrode 4l has depressions at its opposing surface 10l. The shape and size of the depressions are equal to each other, thereby forming hollow gaps 15a at the interface 11. The gaps 15a have a rectangular cross section.

The depressions of each of the sub-electrodes 4k and 4l, which have a depth of 0.05 mm, are regularly formed along the longitudinal axis of the sub-electrodes 4k and 4l and laterally arranged in parallel at a pitch of 5 mm. The gaps 15a have a rectangular cross-section and a depth of 0.1 mm.

With the electric double-layer capacitor 9 according to the sixth embodiment, it is clear that there are the same advantages as those in the first embodiment.

Seventh Embodiment

Figure 12:
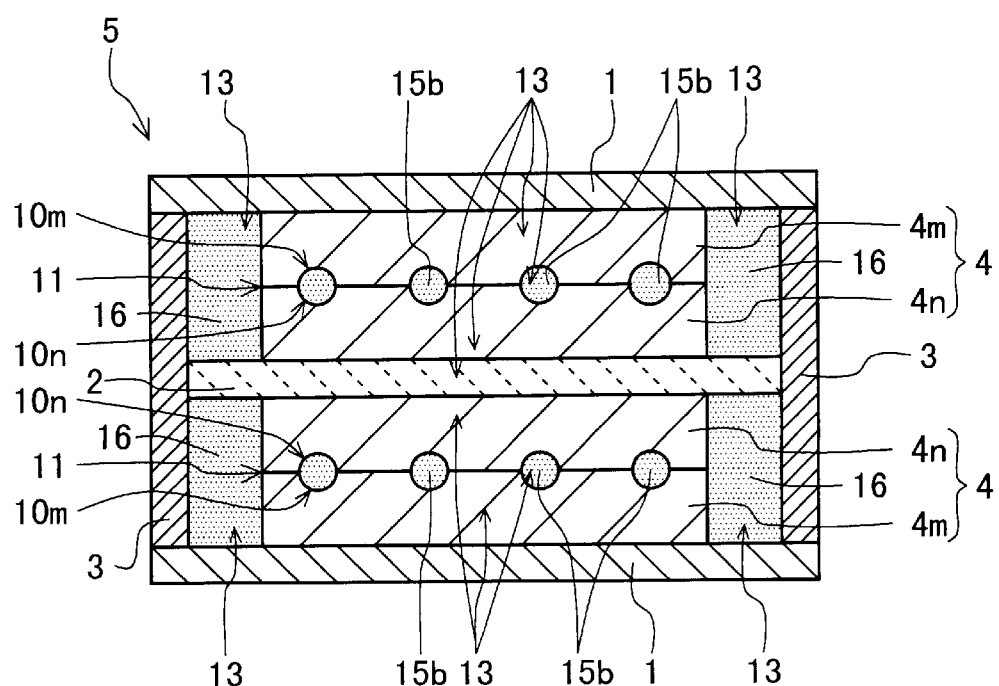
FIG. 12 is a vertical, cross-sectional view of a basic cell of an electric double-layer capacitor according to a seventh embodiment of the present invention, which is along the line IV—IV in FIG. 15.

FIG. 12 shows a basic cell 5 used in an electric double-layer capacitor according to a seventh embodiment of the present invention.

This embodiment is the same as the sixth embodiment except that a sub-electrode 4m has depressions at its opposing surface 10m and a sub-electrode 4n has depressions at its opposing surface 10n. The shape and size of the depressions are equal to each other, thereby forming hollow gaps 15b at the interface 11.

The depressions of each of the sub-electrodes 4m and 4n, which have a maximum depth of 0.1 mm, are regularly formed along the longitudinal axis of the sub-electrodes 4m and 4n and laterally arranged in parallel at a pitch of 5 mm. The gaps 15b have a circular cross-section and a diameter of 0.2 mm.

With the electric double-layer capacitor 9 according to the seventh embodiment, it is clear that there are the same advantages as those in the first embodiment.

Eighth Embodiment

Figure 13:
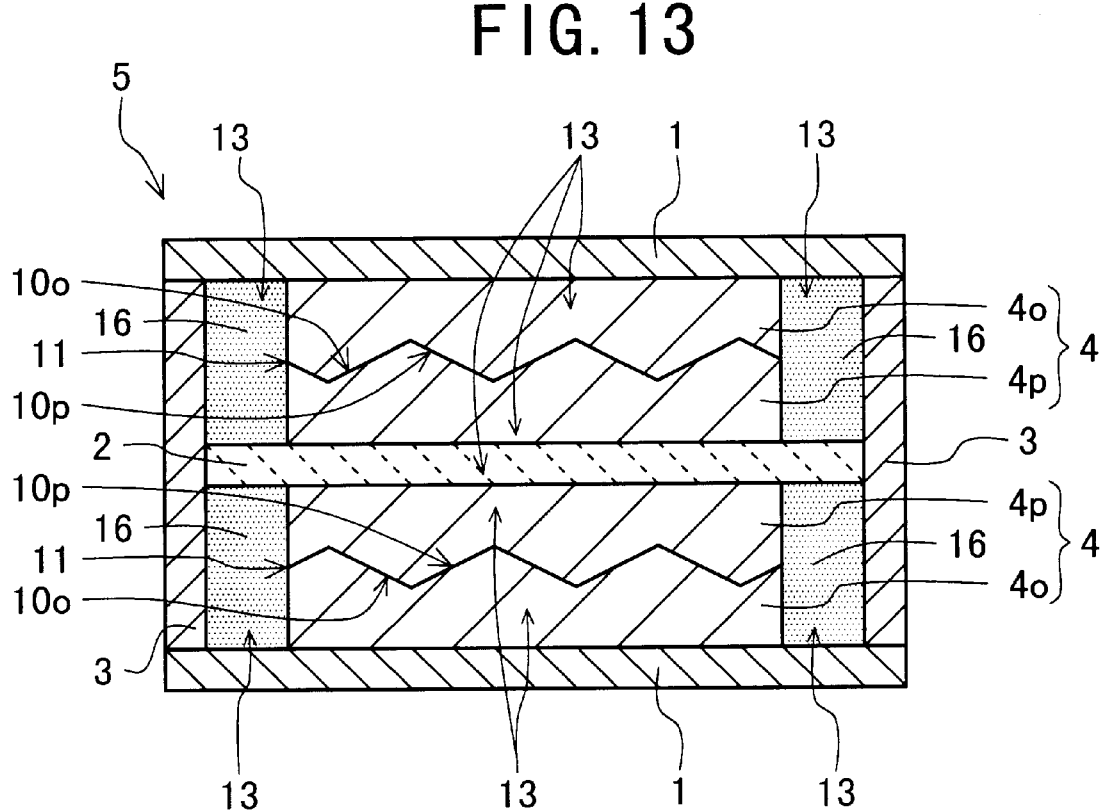
FIG. 13 is a vertical, cross-sectional view of a basic cell of an electric double-layer capacitor according to an eighth embodiment of the present invention, which is along the line IV—IV in FIG. 15.

FIG. 13 shows a basic cell 5 used in an electric double-layer capacitor according to an eighth embodiment of the present invention.

This embodiment is the same as the eighth embodiment except that sub-electrodes 4o and 4p have saw-teeth-shaped opposing surfaces 10o and 10p. Substantially no gap is formed at the interface 11.

The cross section of each saw tooth is a triangle with a bottom side of 5 mm and a height of 0.1 mm.

The saw teeth may be arranged at the opposing surfaces 10o and 10p entirely or partially.

With the electric double-layer capacitor 9 according to the eighth embodiment, it is clear that there are the same advantages as those in the first embodiment.

Ninth Embodiment

Figure 14:
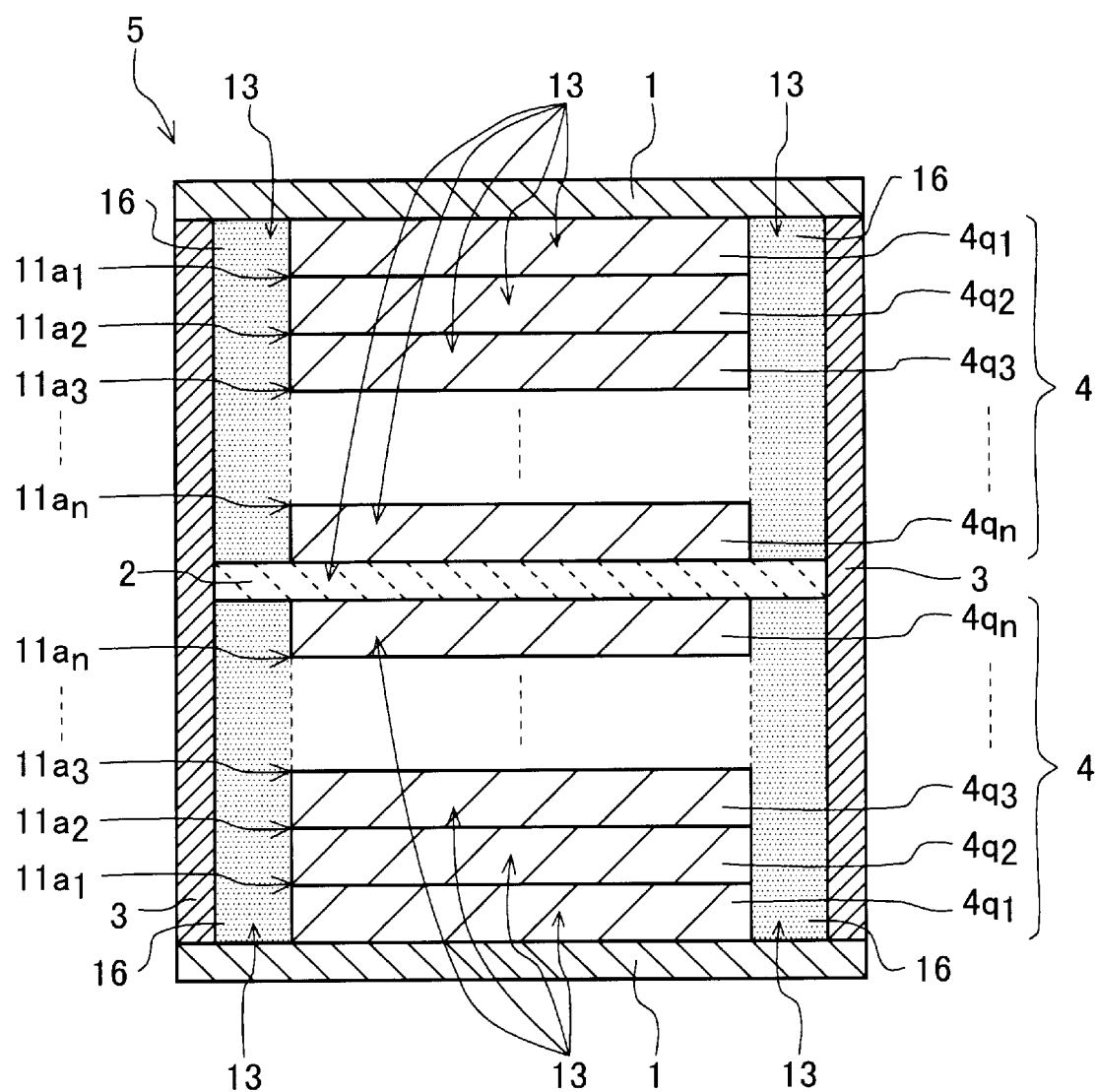
FIG. 14 is a vertical, cross-sectional view of a basic cell of an electric double-layer capacitor according to a ninth embodiment of the present invention, which is along the line IV—IV in FIG. 15.

FIG. 14 shows a basic cell 5 used in an electric double-layer capacitor according to a ninth embodiment of the present invention.

This embodiment is the same as the first embodiment except that each of the polarizable electrodes 4 is formed by n stacked sub-electrodes $4q1$ to $4qn$, where n is a natural number greater than two.

The reference numerals $11a1$ to $11an$ are the interfaces between adjacent two ones of the stacked sub-electrodes $4q1$ to $4qn$.

With the electric double-layer capacitor 9 according to the ninth embodiment, it is clear that there are the same advantages as those in the first embodiment.

There is an additional advantage that the mobility of the ions becomes higher compared with the first to eighth embodiments, because more than one electric double-layers are formed at the interfaces $11a1$ to $11an$.

TESTS

The inventor conducted the following tests to confirm the advantages of the electric double-layer capacitors according to the first to sixth and eighth embodiments of the present invention and the conventional one shown in FIG. 3.

The capacitance of these capacitors was measured at a discharge current of 1, 10 and 10 amperes (A).

The reliability test was conducted in the following way.

The capacitors were driven at a high temperature of 70° C. for 1000 hours while applying a voltage of 15 V and they were completely discharged. Then, the capacitance was measured, and the change of the capacitance with respect to the initial capacitance value (i.e., $\Delta C/C$ (%)) and the change of the ESR with respect to the initial ESR value (i.e., $\Delta E/E$ (%)) were obtained.

The ESR was obtained by measuring the impedance at a frequency of 1 kHz using the AC (Alternating Current) four-probe method, and calculating the real part of the impedance.

The number of the testing samples for each embodiments and conventional one was 30.

The results of the tests are shown in Table 1 listed below, into which the average values for the 30 samples for each of the capacitors are written.

TABLE 1

| EMBODIMENT NO. | SURFACE ROUGHNESS (μm) | CAPACITANCE | | | RELIABILITY TEST | |
|---|---|---|---|---|---|---|
| | | 1A | 10A | 100A | ΔC/C | ΔE/E |
| 1 | 10 | 1.5 | 95 | 77 | −21.5 | +35.4 |
| 1 | 5 | 1.4 | 80 | 45 | −24.8 | +35.2 |
| 1 | 8 | 1.5 | 82 | 47 | −23.7 | +29.8 |
| 1 | 9 | 1.5 | 81 | 46 | −24.2 | +30.5 |
| 1 | 9.5 | 1.4 | 83 | 49 | −22.9 | +34.8 |
| 1 | 10.5 | 1.5 | 98 | 80 | −23.5 | +32.5 |
| 1 | 15 | 1.5 | 100 | 87 | −24.2 | +33.3 |
| 2 | — | 1.8 | 100 | 88 | −20.6 | +34.8 |
| 3 | — | 1.0 | 94 | 80 | −3.5 | +8.5 |
| 4 | — | 1.3 | 98 | 79 | −22.9 | +34.9 |

TABLE 1-continued

| EMBODIMENT NO. | SURFACE ROUGHNESS (μm) | CAPACITANCE | | | RELIABILITY TEST | |
|---|---|---|---|---|---|---|
| | | 1A | 10A | 100A | ΔC/C | ΔE/E |
| 5 | — | 1.6 | 100 | 90 | −21.8 | +29.9 |
| 6 | — | 1.5 | 100 | 85 | −21.5 | +30.5 |
| 8 | — | 1.3 | 98 | 61 | −23.4 | +32.4 |
| CONVENTIONAL | — | 1.0 | 80 | 40 | −25.6 | +38.9 |

In Table 1, the capacitance values at a standard discharge current of 1 A are relative values with respect to the value of the conventional capacitor. The capacitance values at a large discharge current of 10 A are relative values with respect to the corresponding values at the standard discharge current of 1 A, where the values at the standard discharge current of 1 A are set as 100. The capacitance values at a large discharge current of 100 A are relative values with respect to the corresponding values at the standard discharge current of 1 A, where the values at the standard discharge current of 1 A are set as 100.

As seen from Table 1, the capacitance values according to the first to sixth and eighth embodiments are increased up to the value 1.3 to 1.8 times as large as the conventional capacitor, except for the third embodiment. This is because the opposing surfaces of the stacked sub-electrodes contribute to the capacitor behavior (i.e., formation of additional electric double-layers).

The reason why the capacitance value of the third embodiment in FIG. 8 is approximately equal to the conventional one is that the sub-electrodes $4f$ are made of a coconut-shell flour-system activated-carbon. This activated-carbon is made from native coconut shells and therefore, the size and number of the micro pores are difficult to be controlled. Usually, the obtainable capacitance tends to be lowered to approximately 70% of the phenolic-system activated-carbon.

The capacitance value in the third embodiment approximately equal to the conventional one is realized by the fact that the opposing surfaces $10e$ and $10f$ of the sub-electrodes $4e$ and $4f$ contribute to the capacitor behavior.

In the conventional one, the capacitance values at a large discharge current such as 10 A and 100 A are lowered to 80% and 40% of the value at the standard current 1 A, respectively. Contrarily, the capacitance values at a large discharge current such as 10 A and 100 A are 95% or larger at 10 A and 77% or larger at 100 A in the measured first to sixth and eighth embodiments.

However, when the opposing surfaces $10a$ and $10b$ of the sub-electrodes $4a$ and $4b$ have surface roughness of less than 10 μm in the first embodiment, the gap generated at the interface 11 of the opposing surfaces $10a$ and $10b$ of the sub-electrodes $4a$ and $4b$ becomes excessive narrow. Thus, the ions of the electrolyte solution 13 are difficult to pass through the gap in a discharge process. This means that the mobility of the ions is lowered.

With respect to the reliability test, it is seen that the changing rates $\Delta C/C$ (%) and $\Delta E/E$ (%) of the capacitance and ESR are approximately equal to the conventional one, except for the third embodiment, where the sub-electrode $4d$ is made of a coconut-shell flour-system activated-carbon.

Since the phenolic-system activated-carbon has more active function groups on the surface of the micro pores of the activated-carbon, the active function groups tend to chemically react, thereby generating gases. These gases expands the stacked structure 6 of the basic cells 5 and increases the contact resistance. However, the sub-electrode 4d is made of a coconut-shell flour-system activated-carbon in the third embodiment. Therefore, the gasses are difficult to be generated. This leads to the good results of the reliability test.

While the preferred forms of the present invention have described, it is to be understood that modifications will be apparent to those skilled in the art without departing from the spirit of the invention. The scope of the invention, therefore, is to be determined solely by the following claims.

What is claimed is:

1. An electric double-layer capacitor including at least one basic cell and a pair of external terminals electrically connected to outer sides of the at least one basic cell, respectively;

each of said at least one basic cell comprising:
   a tubular electrically-insulating gasket having a tubular inner space and opening ends;
   a pair of polarizable electrodes placed in said inner space of said gasket;
   a porous separator sandwiched between said pair of electrodes and placed in said inner space of said gasket to separate said inner space of said gasket;
   a pair of collectors placed to close said opening ends of said gasket, respectively:
   an electrolyte solution stored in said inner space of said gasket, said solution being absorbed to said pair of electrodes;

each of said pair of electrodes having an inner surface contacted with an opposing surface of said separator and an outer surface contacted with a corresponding one of said pair of collectors;

each of said pair of electrodes being formed by stacked sub-electrodes having at least one interface extending along said pair of collectors; and said at least one interface allowing ions of said electrolyte solution to diffuse between inside and outside of said pair of electrodes through said at least one interface.

2. A capacitor as claimed in claim 1, wherein said stacked sub-electrodes are equal in thickness.

3. A capacitor as claimed in claim 1, wherein said stacked sub-electrodes are different in thickness.

4. A capacitor as claimed in claim 1, wherein said sub-electrodes are different in average pore size.

5. A capacitor as claimed in claim 1, wherein said sub-electrodes are made of different materials.

6. A capacitor as claimed in claim 1, wherein each of opposing surfaces of said sub-electrodes has a surface roughness of approximately 10 $\mu$m or more.

7. A capacitor as claimed in claim 1, wherein one of opposing surfaces of said sub-electrodes has depressions and the other of said opposing surfaces of said sub-electrodes has protrusions;

and wherein said depressions and said protrusions are completely engaged together.

8. A capacitor as claimed in claim 1, wherein each of opposing surfaces of said sub-electrodes has depressions;

and wherein said depressions of said sub-electrodes are combined to form gaps at said interface of said sub-electrodes.

9. A capacitor as claimed in claim 1, wherein each of opposing surfaces of said sub-electrodes is saw-tooth-shaped in cross section.

* * * * *